March 12, 1940.  A. H. CAMPBELL  2,193,712
LAWN MOWER ATTACHMENT
Filed July 5, 1938  2 Sheets-Sheet 1

Inventor
Andrew H. Campbell
By Cyrus Kehr & Sweeker
his Attorneys

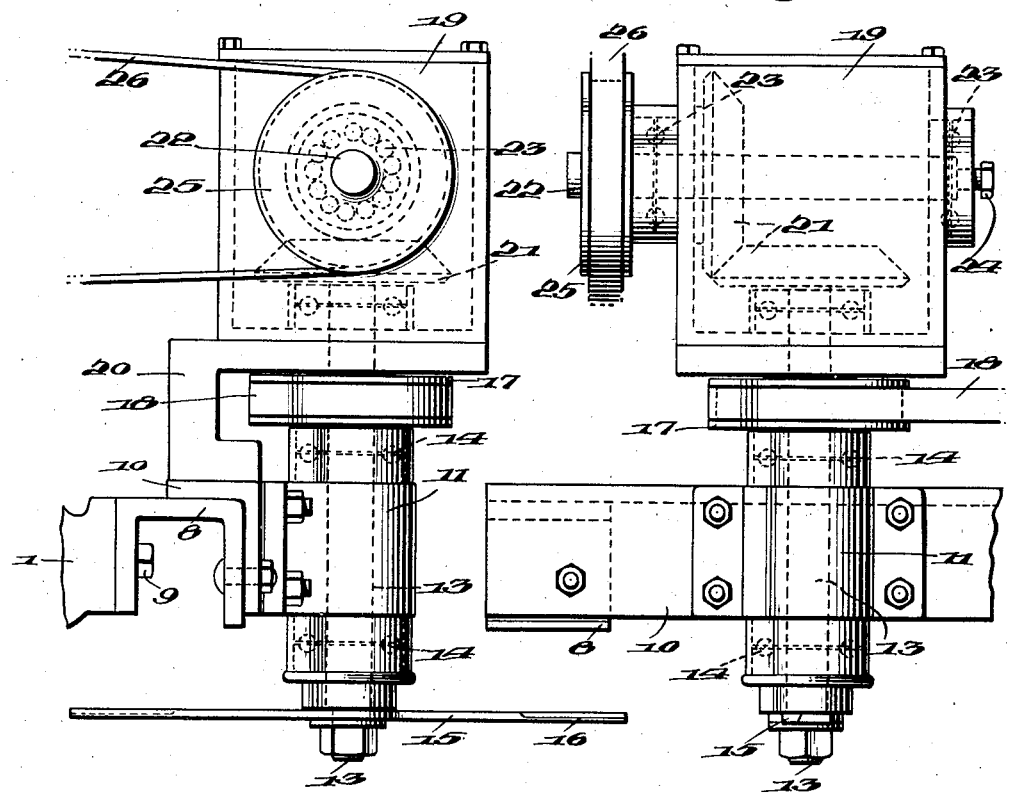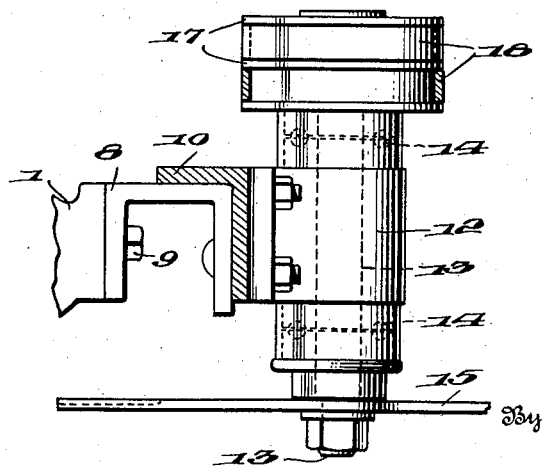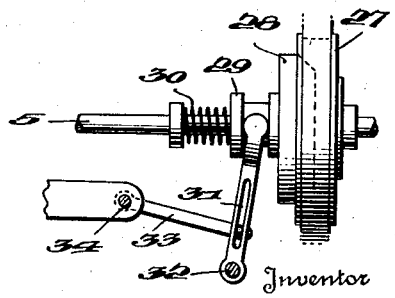

Patented Mar. 12, 1940

2,193,712

UNITED STATES PATENT OFFICE 2,193,712

LAWN MOWER ATTACHMENT

Andrew H. Campbell, Fountain City, Tenn.

Application July 5, 1938, Serial No. 217,597

11 Claims. (Cl. 56—238)

This invention relates to an improvement in lawn mowers and more particularly to an attachment for a power driven lawn mower for cutting weeds and tall grass that may be in a lawn which is too tall to be cut by a conventional mower.

It has been recognized that ordinary lawn mowers of the reel type are ineffective for the cutting of weeds and tall grass in a lawn, because the latter is pushed over by the cutting reel without being drawn between the blades of the reel and the ledger plate.

Efforts have been made to provide auxiliary attachments or cutters for lawn mowers which will provide for the cutting of such weeds and tall grass, but these have proven to be too complicated and expensive for practical and efficient operation and for adoption by the ordinary user of lawn mowers of this type, particularly where such lawn mowers are power driven.

The object of this invention is to simplify the construction of an auxiliary attachment which will cut the weeds and high grass effectively in advance of the main cut of the lawn mower by the reel thereof, which may be readily attached to any type of power driven lawn mower requiring a minimum of power for operation, the construction being so simplified and improved that it may be manufactured at comparatively small cost which will not add materially to the weight of the lawn mower when applied thereto.

The attachment which is the subject-matter of this invention utilizes a plurality of rotary knives operating approximately in a horizontal plane and suitably journaled and supported for efficient operation to be driven from the source of power of the mower. Each of these knives is complete in itself for effectively severing the tall grass and weeds at a height of approximately three inches above the ground and which do not require a ledger plate or cutter to perform this cutting operation.

It is preferred, however, that a guard plate or shield be secured to the frame of the mower above the knives and project forwardly beyond the area of operation thereof, whereby avoiding danger of injury to persons from the knives. I have illustrated a preferred embodiment of this invention in the accompanying drawings, in which:

Fig. 3 is an end elevation of the attachment, with the guard removed;

Fig. 4 is a front elevation of the same showing the mounting of the driving means for one of the knives;

Fig. 5 is a vertical sectional view partly in elevation showing the mounting and drive of an intermediate shaft and knife;

Fig. 6 is a detail rear elevation, partly in section, showing the clutch arrangement for driving the attachment.

Figure 1:
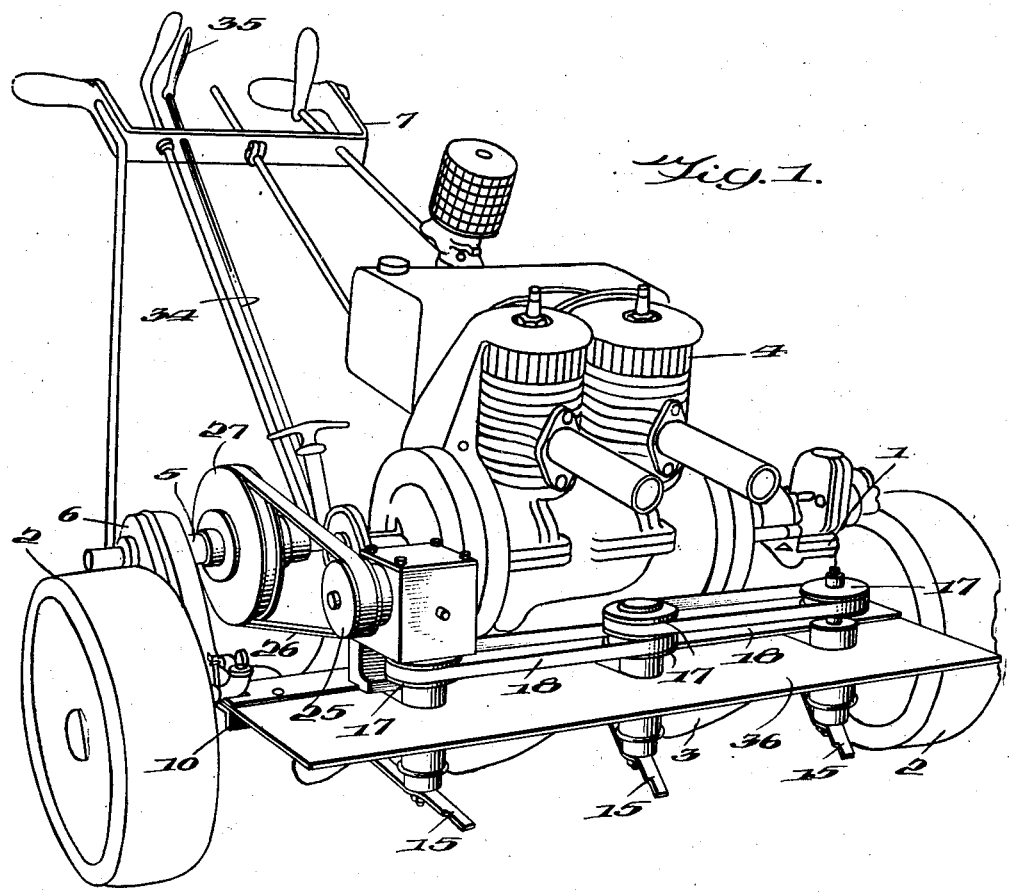
Fig. 1 is a perspective view of the attachment applied to a power driven lawn mower.
Figure 2:
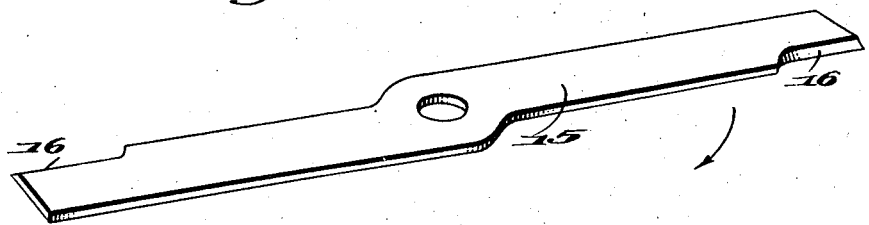
Fig. 2 is a perspective view of one of the cutting blades detached.

In Fig. 1, the improved auxiliary cutting attachment is shown applied to a power driven lawn mower of the revolving blade or reel type. The mower may be of any suitable construction, the one shown in Fig. 1, having a supporting frame 1, provided with a pair of spaced traction wheels 2, and a cutting reel 3, adapted to be driven by an internal combustion engine 4, such as a gasoline engine mounted on the upper portion of the frame. The engine 4 usually drives the traction wheels 2 and the cutting reel 3 through a shaft 5 and a train of gearing and clutches which is designed generally by the numeral 6, and controlled in the usual way from a handle structure 7 of the lawn mower.

The attachment shown includes brackets 8, shown in Figs. 3, 4 and 5, and which are secured to the frame 1 of the mower, as by set screws 9. One of these brackets is mounted at each end portion of the lawn mower frame, within the adjacent traction wheel 2.

Extending lengthwise in front of the mower frame is a supporting bar 10, having its opposite end portions secured to and supported upon the brackets 8 for mounting the attachment on the mower frame. Secured at intervals along the supporting bar 10 are shaft journals 11, each of which is formed as a U-clamp and secured to the front face of the supporting bar 10, with its interior receiving or journaling a supporting shaft 13. Each of the shafts 13 is mounted in anti-friction bearings above and below the shaft journal 11, as indicated at 14, which anti-friction bearings are preferably ball bearings and serve to take the end thrust of the shaft in opposite directions.

Mounted on the lower end of each shaft 13 is a knife 15, which is secured to the shaft and rotates therewith, which knife has a cutting edge portion 16 at opposite ends thereof, the cutting edges 16 at opposite ends being on opposite sides of the center of the knife, so as to cut as the latter is rotated by its supporting shaft. These cutting edges need extend back from the respective ends of the knife only a short distance because that is sufficient to cut effectively the tall grass and weeds as the machine is advanced, due to the high speed of rotation.

For transmitting motion from one to another, each of the shafts 13 has a pulley or pulleys 17 thereon connected by a belt 18 with the next adjacent shaft, the middle one of the three shafts, shown in Fig. 1, having two pulleys 17, one of which receives power from the first shaft and the other of which transmits the power to the third shaft, so that all three shafts rotate at the same speed and in unison.

For driving the knives 15, the first shaft 13 extends upwardly above its pulley 17, into a gear box 19 supported by a bracket 20 on the connecting bar 10. Gearing 21 housed within the gear box 19 connects the shaft 13 with a countershaft 22, journaled in the gear box 19, preferably in ball bearings designed generally by the numeral 23 with provision for end thrust and adjustment at the set screw 24. The countershaft 22 has a pulley 25 thereon connected by a belt 26 with a pulley 27 loosely journaled on the drive shaft 5 of the mower. The gear box 19 is preferably enclosed to contain lubricant for the gears and shafts.

For controlling the drive of the attachment, the pulley 27 has a clutch 28 at one side thereof, such as a cone or friction clutch, the hub 29 of which is slidably keyed to the shaft 5, acted on by the spring 30 which normally tends to press the same into clutch engagement with the pulley 7. A yoke 31 is pivoted at 32 to the frame 1 of the mower, as shown in Fig. 1, and is actuated by an arm 33 mounted on a shaft 34 which extends to the upper end of the mower handle 7. The shaft 34 has an operating handle 35 arranged to manipulate the shaft 34 to release the clutch.

It will be apparent that the power driven lawn mower is operated in the usual way for driving the cutting reel 3 and the traction wheels 2. Normally the clutch 28 will be engaged during this operation unless retracted by the yoke 31 upon manipulation of the handle 35 against the tension of the spring 30.

Motion will be transmitted through the belts 18 and pulleys 17 whereby the knives 15 of the other shafts will be driven simultaneously with the first one. These should be driven at relatively high speed but this may be controlled according to the ratio of the several driving connections.

Figure 7:
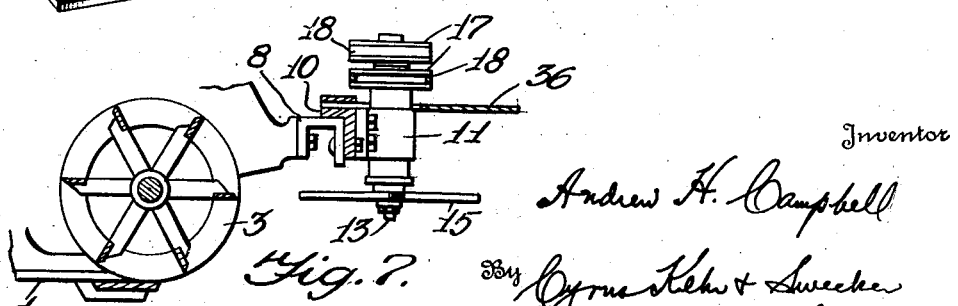
Fig. 7 is a detail sectional view, partly in elevation, showing the relation of the main and auxiliary cutters.

As the machine moves forward in its normal cutting operation, the cutting edges 16 operating at high speed will effectively sever any tall grass or weeds in their paths to a height of approximately three inches, or such that the remainder thereof will be effectively removed by the mower reel 3, the relation of the cutters being shown in Fig. 7. These knives are not overlapping and are not synchronized. This would not be possible owing to the fact that the units are driven by belts and not geared to each other. There is a one-sixty-fourth (1/64) of an inch clearance between the ends of the cutter blades.

In order to prevent injury to persons by contact with the knives, a shield 36, as shown in Fig. 1, is supported upon the connecting bar 10 and extends forwardly of the attachment and approximately throughout the width thereof, to points outside of the cutting area of the knives. This forms an effective shield for the knives without interfering with the normal standing positions of the weeds and tall grass.

I claim:

1. In a lawn mower, the combination with a frame, grass cutting means and power means for driving the grass cutting means, of a plurality of rotary knives, means mounting said knives on the frame for turning movement about approximately vertical axes and spaced above the cutting point of the grass cutting means, and means for driving said knives from the power means of the lawn mower.

2. In a lawn mower, the combination with a frame, grass cutting means and power means for driving said grass cutting means, of a plurality of rotary knives, shafts carrying said knives at points spaced a substantial distance above the grass cutting means, means journaling said shafts on the frame about approximately vertical axes, means connecting said shafts together for joint operation, and means for driving said shafts from the power means of the lawn mower.

3. In a lawn mower, the combination with a frame, grass cutting means and power means for operating said grass cutting means, of a connecting bar secured to the frame, journals carried by said connecting bar at points spaced therealong, shafts rotatably mounted in said journals, each of said shafts carrying a rotary knife on the lower end thereof at points spaced a substantial distance above the grass cutting means, gearing connecting said shafts together for joint operation, and gearing connecting one of said shafts with the power means on the lawn mower for operation thereby.

4. In a lawn mower, the combination with a frame, grass cutting means and power means for operating said grass cutting means, of a connecting bar supported by the frame, a plurality of journals mounted on the connecting bar and spaced at intervals therealong, shafts mounted in said journals for turning movement about approximately vertical axes, a cutting knife carried by the lower end of each shaft at a point spaced above the grass cutting means, driving means connecting the upper ends of the shafts together above the journals for joint operation, a gear box supported on the frame and receiving one of said vertical shafts, a countershaft mounted in the gear box and geared to the last-mentioned vertical shaft, and driving means connecting said countershaft with the power means of the lawn mower.

5. In a lawn mower, the combination with a frame, grass cutting means, power means for driving said grass cutting means, and a shaft connected respectively with the power means and grass cutting means, of a connecting bar secured to the frame at the front of the mower, a plurality of shafts journaled on said connecting bar at points spaced therealong at a point spaced above the grass cutting means, rotary knives carried by said shafts at the lower ends thereof, means connecting the upper ends of the shafts together, driving means for said vertical shafts, and clutch means for connecting the drive shaft of the mower with said driving means for operation of the knives therefrom.

6. In a lawn mower, the combination of a supporting structure having an angle bar extending transversely thereof, a plurality of shafts, journals secured to the front face of the angle bar and separate therefrom, said shafts mounted in said journals about approximately vertical axes and extending above and below the angle bar, rotary knives mounted on the lower ends of said shafts, pulleys mounted on the upper ends of the shafts above the angle bar, and power means connected with one of the shafts for driving the knives.

7. In a lawn mower, the combination with a cutting reel and power means for operating said reel, of one or more rotary knives, means mounting said knives on the lawn mower for turning movement about approximately vertical axes and spaced above and in advance of the lower edge portion of the reel, and means for driving said knives from the power means.

8. In a lawn mower, the combination with a cutting reel and power means for operating said reel, of one or more rotary knives, means mounting said knives on the lawn mower for turning movement about approximately vertical axes and spaced above and in advance of the lower edge portion of the reel, means for driving said knives from the power means, and a guard plate secured to the mower and extending forwardly of the path of movement of the knives at a point spaced a substantial distance thereabove for guarding the knives without interfering with the cutting of weeds thereby.

9. In a lawn mower, the combination with a reel for cutting grass, and means for operating said reel, of a connecting bar extending transversely of the mower in front of the cutting reel, a plurality of vertical shafts journaled on the connecting bar for turning movement about approximately vertical axes, weed cutting knives carried by the lower ends of said shafts, means for driving said shafts from the reel operating means, and a guard plate secured to the connecting bar and extending forwardly therefrom beyond the cutting areas of the knives and spaced a substantial distance thereabove to guard said knives without interfering with the presenting of weeds and grass thereto for cutting.

10. In a lawn mower, the combination with a frame structure with opposite ends, a cutting reel between said ends, and power means for operating said reel, of a connecting bar extending between said frame ends and supported thereon above the reel, a plurality of upright shafts journaled on said connecting bar, a rotary cutter carried by each of said shafts in position for free rotation at a point spaced appreciably above the lower edge of the reel, and means for connecting said power means with said shafts for driving the cutters.

11. In a lawn mower, the combination with a frame structure with opposite ends, a cutting reel between said ends, and power means for operating said reel, of a connecting bar extending between said frame ends and supported thereon above the reel, said bar having an upright front face, journals separate from the bar and rigidly secured to said face and spaced therealong, an upright shaft mounted in each journal and having an anti-friction end thrust bearing thereeround above and below said journal, a rotary cutter mounted on each of said shafts above the lower edge of the reel, and means for connecting said power means with said shafts for driving the cutters.

ANDREW H. CAMPBELL.